(12) United States Patent
Grossein et al.

(10) Patent No.: US 8,083,183 B2
(45) Date of Patent: Dec. 27, 2011

(54) AIR DISCHARGE DEVICE FOR AN AIRCRAFT

(75) Inventors: David Grossein, Toulouse (FR); Arnaud Hormiere, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 48 days.

(21) Appl. No.: 11/969,391

(22) Filed: Jan. 4, 2008

(65) Prior Publication Data

US 2008/0164374 A1    Jul. 10, 2008

(30) Foreign Application Priority Data

Jan. 5, 2007  (FR) ..................................... 07 52546

(51) Int. Cl.
*B64C 1/38*    (2006.01)
(52) U.S. Cl. ........ 244/130; 244/207; 244/208; 244/209; 244/198; 244/201
(58) Field of Classification Search ................. 244/130, 244/207, 208, 209, 198, 201, 204
See application file for complete search history.

(56) References Cited

U.S. PATENT DOCUMENTS

| | | | | | |
|---|---|---|---|---|---|
| 1,162,278 | A | * | 11/1915 | Ziemss, Jr. ..................... | 244/204 |
| 1,456,643 | A | * | 5/1923 | Maxwell, Jr. .................. | 244/204 |
| 1,550,417 | A | | 4/1925 | Barling | |
| 1,733,770 | A | | 2/1928 | Andrake | |
| 1,808,996 | A | * | 6/1931 | Royster ........................... | 244/198 |
| 1,856,228 | A | * | 5/1932 | Sharp ............................. | 244/198 |
| 1,962,411 | A | * | 6/1934 | Rose .............................. | 244/204 |
| 2,464,663 | A | * | 3/1949 | Zingg ............................ | 244/12.1 |
| 2,959,377 | A | * | 11/1960 | Kaplan ........................... | 244/198 |
| 3,128,063 | A | * | 4/1964 | Kaplan ........................... | 244/207 |
| 3,281,095 | A | * | 10/1966 | Runge ............................ | 244/204 |
| 3,545,701 | A | * | 12/1970 | Bertin et al. .................. | 244/12.3 |
| 3,604,661 | A | * | 9/1971 | Mayer, Jr. ..................... | 244/207 |
| 3,721,406 | A | * | 3/1973 | Hurlbert ....................... | 244/216 |
| 3,840,199 | A | * | 10/1974 | Tibbs ............................ | 244/207 |
| 3,920,203 | A | * | 11/1975 | Moorehead .................. | 244/207 |
| 4,392,621 | A | * | 7/1983 | Viets ............................ | 244/12.5 |
| 5,934,608 | A | * | 8/1999 | Dockter ..................... | 244/17.19 |
| 6,050,527 | A | * | 4/2000 | Hebert et al. ................ | 244/210 |
| 6,109,565 | A | * | 8/2000 | King, Sr. ..................... | 244/207 |
| 6,658,881 | B1 | | 12/2003 | Plattner | |
| 2005/0051372 | A1 | | 3/2005 | Guertler | |

FOREIGN PATENT DOCUMENTS

| | | |
|---|---|---|
| DE | 853 388 C | 10/1952 |
| FR | 1 442 468 A | 6/1966 |
| GB | 433 027 A | 8/1935 |
| GB | 503 799 A | 4/1939 |

OTHER PUBLICATIONS

French Search Report correspond to FR0752546, dated Aug. 15, 2007.

* cited by examiner

*Primary Examiner* — Tien Dinh
*Assistant Examiner* — Justin Benedik
(74) *Attorney, Agent, or Firm* — Young & Thompson

(57) ABSTRACT

An air discharge device includes a grid that is connected to an aerodynamic surface of an aircraft. The grid includes a number of openings delimited by intermediate zones that are arranged in the extension of the aerodynamic surface of the aircraft and at least one longitudinal reinforcement separating the openings into at least two stages. The dimensions and/or the surface ratio of the perforated zones that correspond to openings and non-perforated zones that correspond to intermediate zones or to the longitudinal reinforcement are such that they create a depression close to the air discharge.

7 Claims, 3 Drawing Sheets

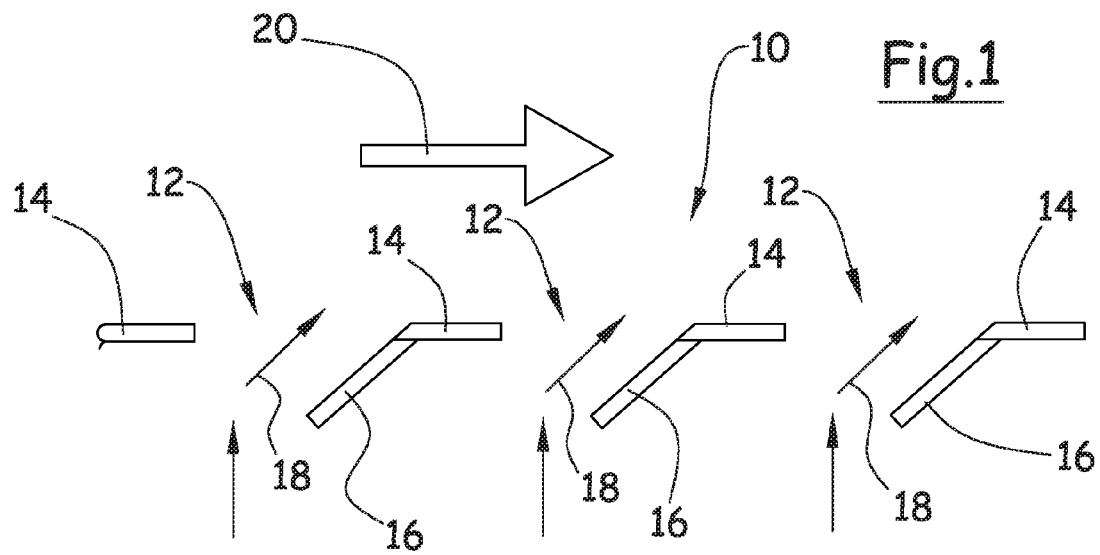
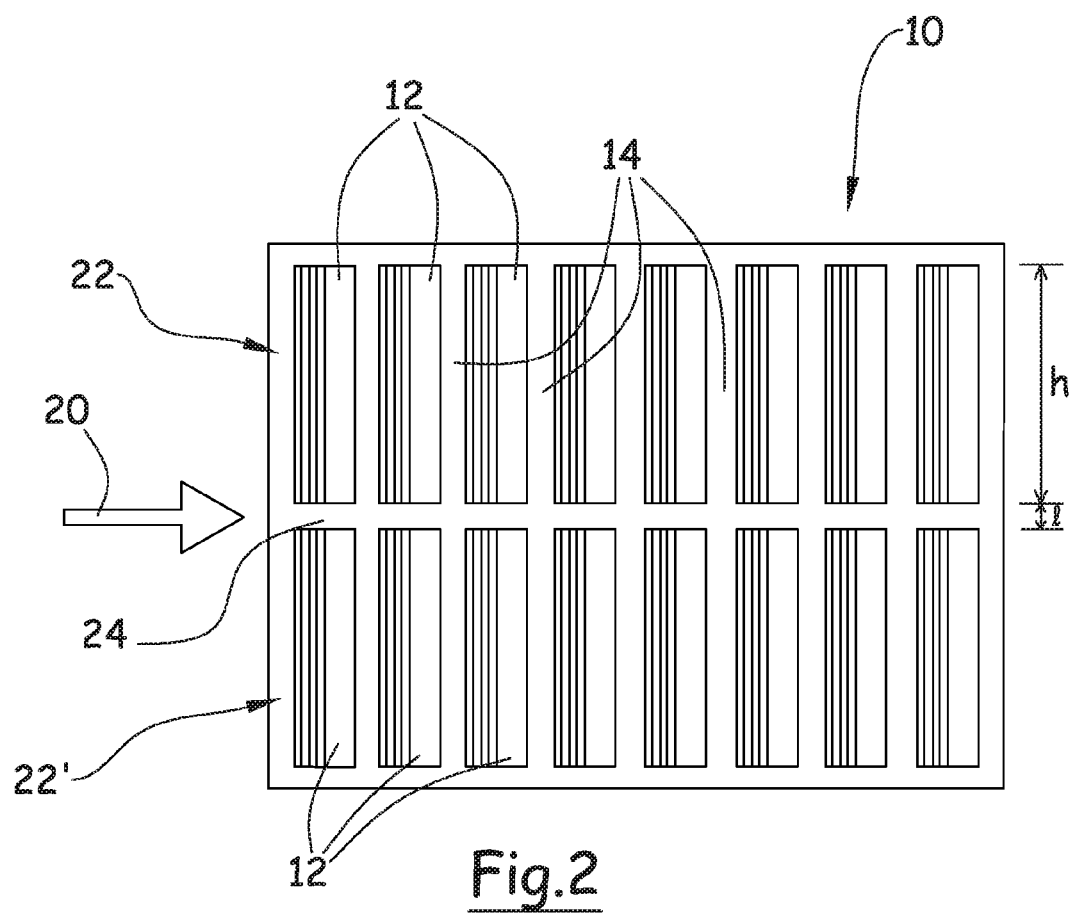

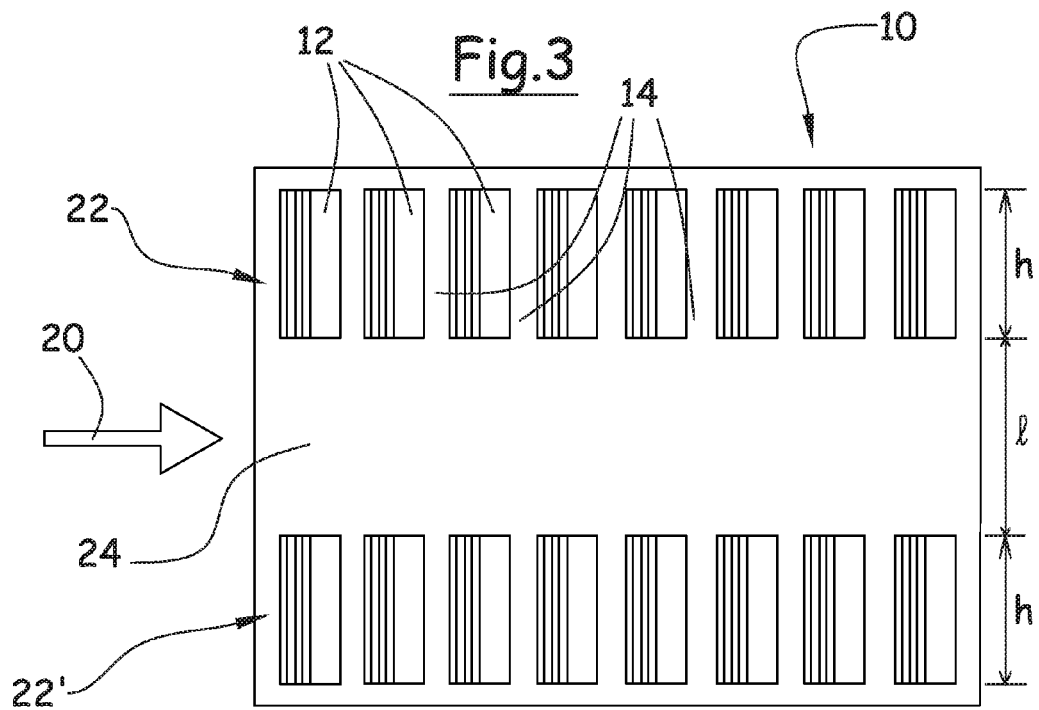
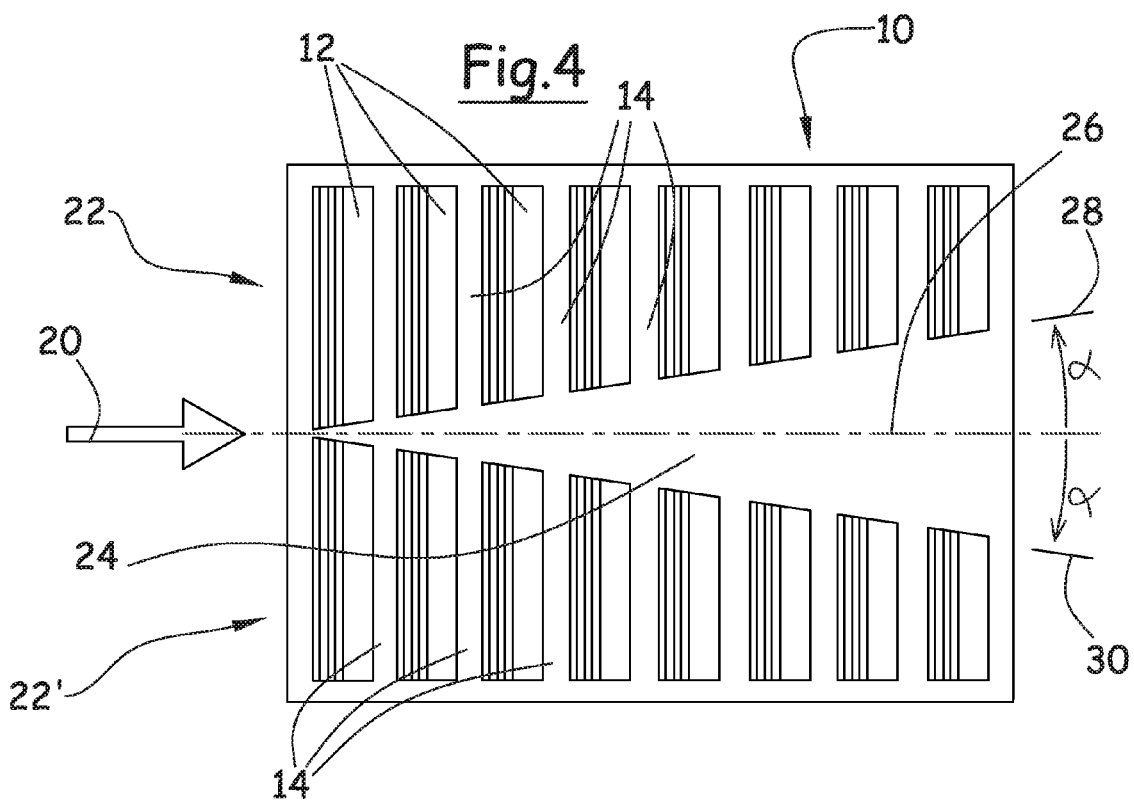

AIR DISCHARGE DEVICE FOR AN AIRCRAFT

This invention relates to an air discharge device for an aircraft that is more particularly designed to be used on an aerodynamic surface that is able to be in contact with the air flows that flow on the exterior of said aircraft.

An aircraft is generally equipped with air systems, in particular to ensure heating, cooling or ventilation, comprising circuits that extend from at least one air intake up to at least one air discharge by passing through exchangers or any other device that requires air or that operates with air.

These air systems inevitably induce a parasitic drag that originates from, for example, surface defects that are linked to the implantation of the intake or discharge at the surface that is in contact with the outside air flow or due to the difference between the flow rate that is picked up and that which is discharged in said air flow.

To meet the expectations of clients however, the aircraft manufacturers seek to improve the aerodynamics of their equipment so as to reduce their operating costs that are strongly linked to fuel consumption.

An air discharge device influences the aerodynamics of the aircraft due to the parasitic drag generated when it does not produce any air that originates from the surface defect or when it produces the air that results from the disturbance of the outside air flow.

Furthermore, the differential heads undergone by the air flow of the system during its passage through the air discharge also influence the aerodynamics of the aircraft due to the difference between the flow rate that is picked up and that which is discharged from the air system.

To compensate for these negative influences, an attempt is made to recover the thrust that is provided to the aircraft by the air discharge. In this sense, the ideal is to eject the air in the direction of the outside air flow, with a high ejection rate so as to maximize the thrust force modulus.

According to the prior art, there are two large families of air discharges.

The first family of dynamic-type discharges comprises a bulge at the air discharge, describing an elbow with an outlet that is oriented toward the rear of the aircraft.

This configuration makes it possible to reduce the differential heads to the extent that the outlet protects the air of the system from the outside air flow by guiding it gradually in the direction of said outside air flow that also contributes to maximizing the recovery of the thrust produced by the exiting air.

This configuration, however, creates a considerable surface defect that produces a significant parasitic drag.

Consequently, this solution is recommended when the energy of the flow exiting from the system is higher than that of the flow of the outside air, in particular when the advantages that are derived from the recovery of the thrust generated by the exiting air compensate for the drawbacks that are linked to the parasitic drag that is created.

This invention relates more specifically to the second family of air discharges of the leveling type. Relative to the dynamic type discharges, the discharges of the leveling type generate a smaller surface defect and less of a parasitic drag.

However, this configuration is less capable in terms of differential head and thrust recovery to the extent that it is difficult to orient the exiting air in the direction of the outside air flow.

According to one embodiment, an air discharge of the leveling type comes in the form of a grid as illustrated in FIGS. 1 and 2. This solution is recommended when the energy of the flow exiting from the air system is less than that of the outside air flow. An air discharge 10 in grid form comprises a number of rectangular-shaped openings 12 that are delimited by intermediate zones 14 that are arranged in the extension of the aerodynamic surface of the aircraft, whereby each opening 12 comprises a deflector 16 that is oriented toward the inside and inclined so as, on the one hand, to direct the exiting air that is indicated by the arrows 18 in a direction that is close to that of the outside air flow 20, and, on the other hand, to reduce the size of the surface defect.

According to a widespread embodiment, the air discharge comprises several stages 22 of openings 12, whereby said stages are separated by at least one reinforcement or passage 24 that makes it possible to increase the mechanical characteristics of the grid, whereby this reinforcement: has a width l that is clearly less than the height h of an opening stage 22.

These grid-type air discharges make it possible to reduce considerably the surface defect. However, they are not satisfactory in terms of differential heads, which remain significant.

Also, this invention aims at eliminating the drawbacks of the prior art by proposing a grid-type air discharge device that makes it possible to optimize the aerodynamic characteristics of said discharge.

For this purpose, the invention has as its object an air discharge device in the form of a grid connected to an aerodynamic surface of an aircraft, whereby said device comprises a number of openings delimited by intermediate zones that are arranged in the extension of the aerodynamic surface of the aircraft and at least one longitudinal reinforcement or passage separating the openings into at least two stages, characterized in that the arrangement, the dimensions and/or the surface ratio of the perforated zones that correspond to openings and non-perforated zones that correspond to intermediate zones or to the passage(s) are such that they make it possible to create a depression close to the air discharge.

This configuration makes it possible to reduce, upstream from the air discharge, the pressure that is necessary for the extraction of the flow, and thereby to reduce the differential heads.

It also makes it possible, at an equal flow rate passing through the discharge, to reduce the surface area of the perforated zones, corresponding to the effective outlet section, which makes it possible to reduce the parasitic drag and to increase the recovered thrust, whereby the ejection rate is higher.

Other characteristics and advantages will emerge from the following description of the invention, a description that is given only by way of example, taking into account the accompanying drawings, in which:

FIG. 1 is a cutaway of an air discharge,

FIG. 2 is a lateral elevation view of an air discharge according to the prior art, FIG. 3 is a lateral elevation view of an air discharge according to an embodiment of the invention, FIG. 4 is a lateral elevation view of an air discharge according to another embodiment of the invention.

Figure 5:
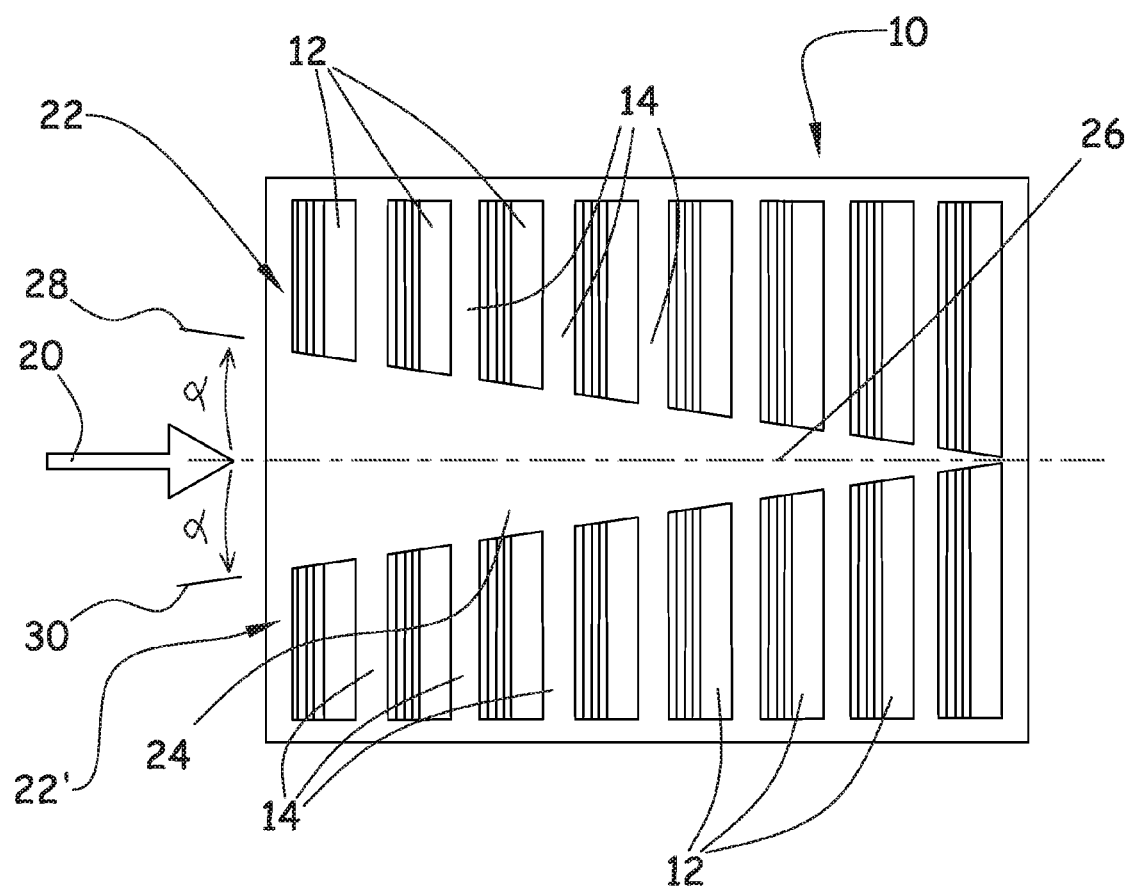
FIG. 5 is a lateral elevation view of an air discharge according to another embodiment of the invention.

In FIG. 1, an air discharge device 10 in the form of a grid connected to an aerodynamic surface of an aircraft is shown in cutaway. This grid can be provided at the nacelle, fuselage, a mast or the wing. Nevertheless, other positions can be considered.

This air discharge 10 can be integrated with one of the air systems of the aircraft, each comprising a circuit that extends from at least one air intake up to at least one air discharge by passing through at least one exchanger or any other device that requires air or that operates with air, such as, for example, a heating, cooling or ventilation system. These air systems are not presented in more detail because they are known to one skilled in the art. Furthermore, the air discharge according to the invention is not limited to these applications and may be suitable for other circuits, other devices, or other air intakes.

According to one embodiment, an air discharge 10 comprises a number of openings 12 that are delimited by intermediate zones 14 that are arranged in the extension of the aerodynamic surface of the aircraft, whereby each opening 12 comprises a deflector 16 that is oriented toward the inside and inclined so as, on the one hand, to direct the exiting air that is indicated by the arrows 18 in a direction that is close to that of the flow of outside air 20, and, on the other hand, to reduce the size of the surface defect.

As a variant, the grid cannot comprise any deflector or deflectors in the form of articulated flaps along axes of rotation provided at one of the sides of the opening, in particular the one that is perpendicular to the outside air flow 20 and arranged downstream along this same flow 20. The movement of the flaps, in particular the opening of the flaps, can be controlled by any suitable means. To limit the surface defects, the openings have a narrow width.

To increase the mechanical and structural characteristics of the air discharge 10, the latter comprises at least one longitudinal reinforcement 24 or passage that separates the openings into at least two stages 22 and 22'. This or these passage(s) 24 make(s) it possible to limit the height (direction perpendicular to the outside air flow 20) of the openings to limit the risks of flexion of the intermediate zones 14 that are provided between the openings of the same stage.

According to an embodiment, a grid comprises a plate that comprises a peripheral frame for its attachment in which the openings 12, separated by the intermediate zones 14 and the longitudinal reinforcement 24, are cut out.

According to the invention, the arrangement, the dimensions and/or the surface ratio of the perforated zones corresponding to the openings 12 and non-perforated zones corresponding to the intermediate zones 14 or to the passage(s) 24 are such that they make it possible to create a depression close to the air discharge 10, which makes it possible to reduce the pressure necessary to the extraction of the flow upstream from the air discharge.

According to a first variant that is illustrated in FIG. 3, at least one passage 24 has a thickness 1 that is more than the height of the openings 12 and preferably less than 2× the height of said openings 12, or h≦1≦2 h.

According to another variant that is illustrated in FIG. 4, at least one passage 24 has a divergent shape in the direction of the flow of outside air 20. Thus, the openings 12 are arranged on both sides of a median axis 26, whereby the upper limit 28 of the passage forms an angle α that is between 5 and 15° relative to said median axis 26 and/or the lower limit 30 of the passage that forms an angle α of between 5 and 15° relative to said median axis 26.

According to another variant that is illustrated in FIG. 5, at least one passage 24 has a convergent shape in the direction of the flow of outside air 20. As above, the openings 12 are arranged on both sides of a median axis 26, whereby the upper limit 28 of the passage forms an angle α of between 5 and 15° relative to said median axis 26 and/or the lower limit 30 of the passage that forms an angle α of between 5 and 15° relative to said median axis 26.

If appropriate, an air discharge 10 in grid form can comprise passages that may or may not be identical, whereby some of them can be in accordance with the variant that is illustrated in FIG. 3, others with the variant that is illustrated in FIG. 4, and others, finally, with the variant that is illustrated in FIG. 5.

The configurations according to the invention make it possible to reduce the differential heads that are generated by the air discharge 10 onto the exiting air 18. Thus, for a given flow, it is possible to reduce the surface area of the openings 12, also called effective outlet section.

This effective outlet section reduction makes it possible, on the one hand, with equal flow rate, to obtain an increase of the ejection rate of the exiting air 18 that is proportional to the reduction of said section, which contributes to increasing the thrust induced by the exiting air to the advantage of the aircraft, and, on the other hand, a reduction of the surface defect, which has the effect of reducing the parasitic drag.

Finally, the reduction of the differential heads at the air discharge makes it possible to reduce the overall differential heads of the air system to which it belongs, which also contributes to reducing the parasitic drag that is linked to the difference between the flow rate that is picked up and that which is discharged of said air system.

According to another advantage obtained by the configurations of the invention, in the case of an ejection of an air flow at high temperature, they make it possible to prevent a creeping hot flow downstream from the air discharge 10 and promote its separation due to the increase of the ejection speed, which contributes to reducing the risks of deterioration of the aerodynamic surface of the aircraft. Furthermore, the wide-passage variant that is illustrated in FIG. 3, and the divergent-passage variant that is illustrated in FIG. 4 obtain a better mixing of the hot and cold flows, which makes it possible to reduce the heating risks downstream from the air discharge.

Of course, the invention obviously is not limited to the embodiment shown and described above, but on the contrary covers all the variants thereof, in particular regarding the dimensions, the shapes, and the materials of the air discharge.

The invention claimed is:
1. An aircraft system comprising:
an air circuit extending from an air intake to an air discharge; and
a plate closing said air discharge,
said plate comprising a peripheral frame adapted to be connected to an aerodynamic surface of an aircraft, said plate having plural openings delimited by intermediate zones and at least one longitudinal reinforcement that separates said plural openings into at least two stages, said intermediate zones being a flat surface and said at least one longitudinal reinforcement being a flat surface coplanar with the flat surface of said intermediate zones and arranged to be an extension of the aerodynamic surface of the aircraft,
wherein a largest dimension of said intermediate zones is oriented perpendicular to said at least one longitudinal reinforcement,
wherein a pair of said plural openings, one from each of said two stages, perpendicular to and separated by said at least one longitudinal reinforcement have a same length in a direction perpendicular to said at least one longitudinal reinforcement, and
wherein a width of said at least one longitudinal reinforcement between said pair of plural openings is more than the length of one of said plural openings in said pair and less than twice this length.

2. The system of claim 1, wherein said plural openings have the same length.

3. The system of claim 1, wherein said at least one longitudinal reinforcement has a divergent shape in a direction of flow of outside air.

4. The system of claim 3, wherein said openings are on both sides of a median axis, wherein a first edge of said longitudinal reinforcement has an angle of from 5° to 15° relative to the median axis and an opposite edge of said longitudinal reinforcement has an angle of from 5° to 15° relative to the median axis.

5. The system of claim 1, wherein said at least one longitudinal reinforcement has a convergent shape in a direction of flow of outside air.

6. The system of claim 5, wherein said openings are on both sides of a median axis, wherein a first edge of said longitudinal reinforcement has an angle of from 5° to 15° relative to the median axis and an opposite edge of said longitudinal reinforcement has an angle of from 5° to 15° relative to the median axis.

7. An aircraft comprising the system of claim 1.

\* \* \* \* \*